United States Patent
Appleby et al.

(10) Patent No.: US 7,792,957 B2
(45) Date of Patent: Sep. 7, 2010

(54) METHOD AND SYSTEM FOR DETERMINING A PLURALITY OF SCHEDULING ENDPOINTS IN A GRID NETWORK

(75) Inventors: Richard M. Appleby, Warsash (GB); John P. Easton, Bradley (GB)

(73) Assignee: International Business Machines Corporation, Armonk, NY (US)

(*) Notice: Subject to any disclaimer, the term of this patent is extended or adjusted under 35 U.S.C. 154(b) by 608 days.

(21) Appl. No.: 11/426,953

(22) Filed: Jun. 28, 2006

(65) Prior Publication Data

US 2007/0016590 A1 Jan. 18, 2007

(30) Foreign Application Priority Data

Jun. 29, 2005 (GB) .................... 0513321.0

(51) Int. Cl.
*G06F 15/173* (2006.01)

(52) U.S. Cl. .............. 709/224; 709/201; 709/205; 718/102

(58) Field of Classification Search .......... 709/224, 709/205, 201; 718/102
See application file for complete search history.

(56) References Cited

U.S. PATENT DOCUMENTS

| 7,342,900 | B2* | 3/2008 | Xiong et al. ........... 370/328 |
| 2002/0021689 | A1* | 2/2002 | Robbins et al. ......... 370/352 |
| 2005/0154789 | A1* | 7/2005 | Fellenstein et al. ..... 709/223 |
| 2007/0078960 | A1* | 4/2007 | Dawson et al. ......... 709/223 |

* cited by examiner

*Primary Examiner*—Joseph Thomas
*Assistant Examiner*—Andrew Georgandellis
(74) *Attorney, Agent, or Firm*—Andrea Bauer; Hoffman Warnick LLC

(57) ABSTRACT

A method for determining a plurality of scheduling endpoints in a grid network, each scheduling endpoint comprising a device for processing job requests communicated across the network, the method comprising the steps of: examining a communication across the network in order to determine a current activity status of a requesting device; identifying an activity history for the requesting device; comparing the current activity status with the activity history to derive a statistical data set; and analysing the statistical data set to derive a time period in which the requesting device is available for processing job requests.

6 Claims, 4 Drawing Sheets

METHOD AND SYSTEM FOR DETERMINING A PLURALITY OF SCHEDULING ENDPOINTS IN A GRID NETWORK

FIELD OF THE INVENTION

The invention relates to the field of grid computing. In particular the invention relates to a method and system for scheduling work in a grid computing environment.

BACKGROUND OF THE INVENTION

A grid is a collection of machines, each machine having a number of resources which are contributed either alone or in combination to a grid network. Spare computing resources are identified on each of the collection of machines and used to process units of work.

There are a number of ways in which the spare computing resources of a grid network can be utilised. Firstly, an application can be run on an available machine within the grid network, rather than locally. Secondly, an application which is designed to split its work in such a way that the separate parts of the application can execute in parallel on different processors can be run on the grid network, and thirdly an application that needs to be executed many times on many different machines may also be run.

A grid network may also be used for the storage of data, often called a data grid. Each machine on the grid network usually provides some quantity of storage for the grid to use, even if temporary. Storage can be memory attached to the processor or it can be secondary storage using hard disk drives or other permanent storage media.

In order to use the spare computing resource of any particular machine, the spare computing resource must first be identified. Currently, in order to achieve this, software is installed on each machine within the grid network. The software identifies when the machine has spare resources which are available for use and sends a notification to a scheduling application of its availability to accept further work. The scheduler allocates the requests to the notifying machine and sends the job for processing.

A problem with this approach is one of increased network traffic. This is because each machine within the grid network must notify the scheduler of its availability to process a unit of work. Thus, if the grid comprises one hundred machines, each one of those machines will send a notification to the scheduler of availability of its spare resource—thus increasing network traffic. Further, problems occur in the amount of resource used by the resource identification software installed on each machine. This resource could be used to process other requests. In addition, the maintenance involved in maintaining the resource identification software on each machine adds another burden to the overall solution.

Thus there is a need within the prior art to find an improved method of scheduling work in a grid network which solves problems such as those discussed above.

SUMMARY OF THE INVENTION

Viewed from a first aspect, the present invention provides a method for determining a plurality of scheduling endpoints in a grid network, each scheduling endpoint comprising a device for processing job requests communicated across the network, the method comprising the steps of: examining a communication across the network in order to determine a current activity status of a requesting device; identifying an activity history for the requesting device; comparing the current activity status with the activity history to derive a statistical data set; and analyzing the statistical data set to derive a time period in which the requesting device is available for processing job requests.

The invention advantageously provides a method and a system for monitoring network traffic in a grid network to build a profile of activity patterns for each device detected within the network. Copies of network packets are taken and sent to an analyser component for analysis. Network parameters are extracted from the data packet to determine a) the device initiating the communication, b) who the requesting device is communicating with and c) the type of resource the requesting device is requesting. By extracting and analysing the network parameters it is possible to determine what type of device the requesting device is and subsequently the characteristics the requesting device is likely to exhibit. For example, if the requesting device is a server, the server will exhibit different operational characteristics when compared with a client device. Further, by detecting a communication from a requesting device on the network, ongoing activity patterns can be detected. Further, the communication also signifies that the requesting device is operational and active on the grid network. Therefore, as an on-going activity history is continually derived, one or more time periods may be derived for when the requesting device is available for work. Further, when the requesting device is detected as being active on the network, the requesting device is sent jobs to process in accordance with the one or more determined time periods. Advantages provided by the present invention comprise, for example: no specialist software is required to be installed on any of the devices in the network; network traffic is reduced because it is the existing data packets which are intercepted; and by building an activity profile for each device it is possible to make an informed decision, based on a probability score of the likelihood of an activity pattern re-occurring, when to schedule jobs for processing.

Preferably, the present invention provides a method wherein the analysing step comprises deriving a probability score indicative of the likelihood of a pattern of activity re-occurring.

Preferably, the present invention provides a method wherein the examining step further comprises extracting a set of network parameters from the communication, the set of network parameters comprising an IP address of the requesting device, an IP address of the destination address and a type of resource the requesting device is requesting.

Preferably, the present invention provides a method wherein the examining step further comprises analysing the destination IP address and the type of resource to determine a category of device the requesting device falls into.

Preferably, the present invention provides a method wherein on determining the category of device, an activity characteristic for the requesting device is derived.

Preferably, the present invention provides a method wherein the activity characteristic in combination with the historical activity and the current activity status form parameters for the statistical data set.

Preferably, the present invention provides a method wherein on examining a communication from a requesting device indicates the requesting device is active and available on the network.

Preferably, the present invention provides a method further comprising identifying the type of data packet and performing a lookup, in a data store, to identify the format of the data within the identified data packet type.

Preferably, the present invention provides a method wherein the network parameters are extracted from the data packet and stored in accordance with the format of the data packet type.

Preferably, the present invention provides a method wherein the extracted network parameters may further comprise vendor extension identifying the hardware and software installed on the requesting device.

Viewed from a second aspect, the present invention provides a system for determining a plurality of scheduling endpoints in a grid network, each scheduling endpoint comprising a device for processing job requests communicated across the network, the system comprising: an examining component for examining a communication across the network in order to determine a current activity status of a requesting device; an identifying component for identifying an activity history for the requesting device; a comparing component for comparing the current activity status with the activity history to derive a statistical data set; and an analysing component for analysing the statistical data set to derive a time period in which the requesting device is available for processing job requests.

Viewed from a third aspect the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings.

DETAILED DESCRIPTION OF THE INVENTION

Figure 1:
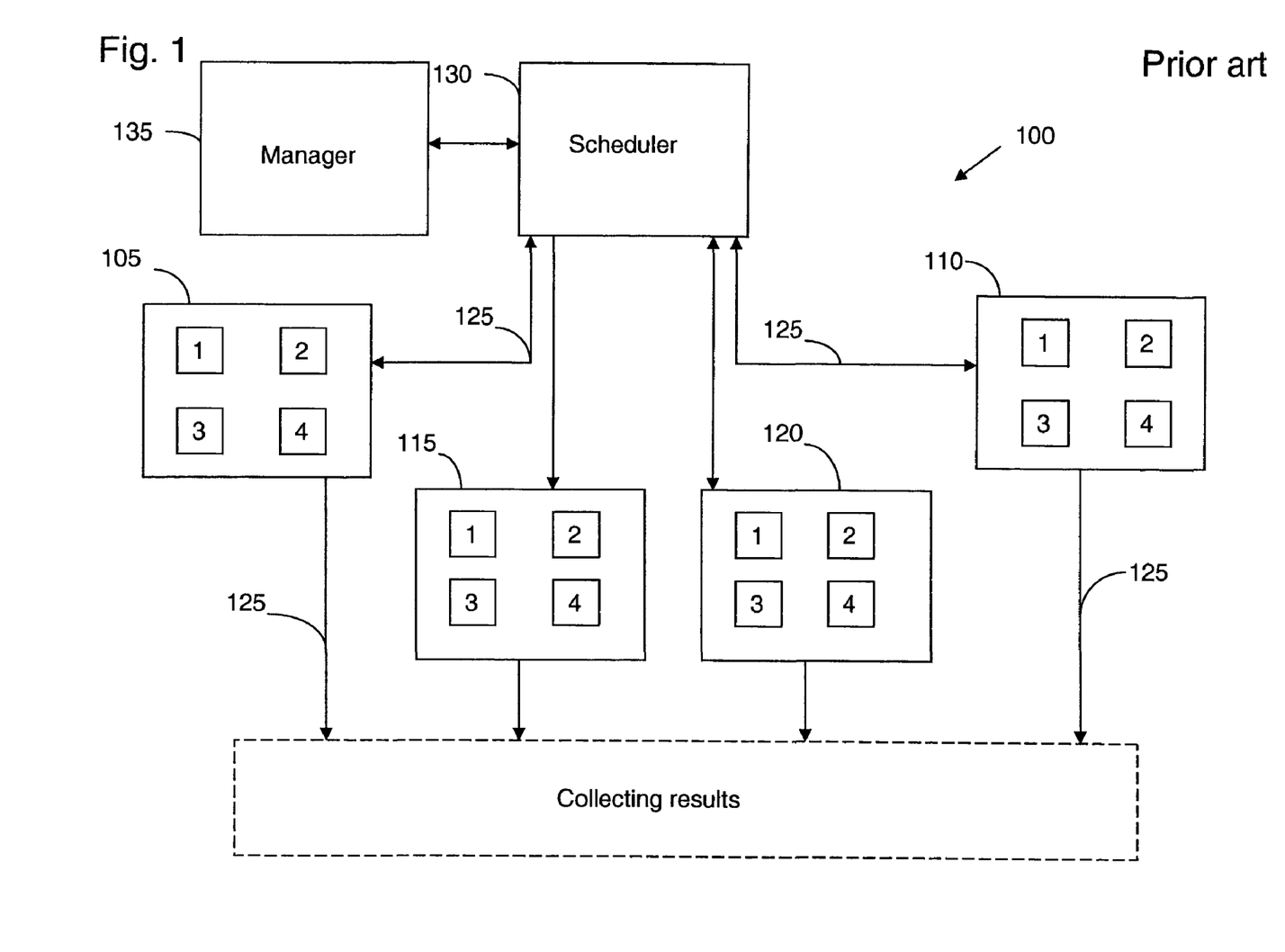
FIG. 1 details a prior art grid computing network in which a preferred embodiment of the present invention may be deployed.

FIG. 1 shows a grid network arrangement 100 as is known in the art. The grid network 100 comprises a plurality of machines 105, 110, 115, 120. Each machine 105, 110, 115, 120 interconnected to further machines 105, 110, 115, 120 via a network 125, such as an Intranet, a wide area network, or the Internet, etc. A machine 105, 110, 115, 120 operating in the grid network 100 may comprise any form of device, for example, a server or a client device which is capable of processing a number of jobs. A job may be characterised as a unit of work. Jobs are programs that are executed at an appropriate point within the grid network 100. A job may compute data, execute one or more system commands, move or collect data, or operate machinery. A job may have specific dependencies that may prevent the job from executing in parallel. For example, a job may require some specific input data that must be copied to the machine in which a job is to run. Other jobs may require output produced by certain other jobs and cannot be executed until the prerequisite jobs have completed.

Each machine 105, 110, 115, 120 comprises a number of computing resources which may be utilised by other machines 105, 110, 115, 120. For example, spare processor computing cycles provided by a processor 1, memory provided by a number of random access memory modules 2, permanent storage provided by at least one disc drive 3, and specific software applications 4.

Each machine 105, 110, 115, 120 comprises software for detecting spare computing resources. For example, each machine 105, 110, 115, 120 comprises software for detecting when a machine is not currently processing a job, when a machine has finished processing a job, or when a machine is under utilised and has spare computing resource(s) to process additional jobs or, in a data grid, detecting when there is spare storage capacity to store additional data, etc. As each software application detects spare computing resources on its respective machine, the software alerts the scheduler of the machine's availability for processing further jobs.

The grid network 100 also comprises a management component 135 for identifying which machines 105, 110, 115, 120 are connected to the grid network 100. The management component 135 tracks the resources available in the grid and which machines 105, 110, 115, 120 are using the grid network 100. The information collected by the management component 135 is used to determine which machines 105, 110, 115, 120 can be assigned particular jobs.

A scheduler component 130 receives information collected by the management component 135 and executes a job priority system. The type of job priority system deployed varies depending on the type and complexity of the grid network. For example, in a basic grid type arrangement the scheduler may be implemented in the form of having several job queues for the queuing of jobs waiting to be processed within the grid network 100. Each job queue is given a priority order. As machines 105, 110, 115, 120 become available; the jobs are taken from the queue with the highest priority order. In a more complex grid network, the scheduler 130 monitors and manages the workflow of the grid network 100, assigning jobs to particular machines for processing. In this example, if jobs are lost due to system or network outages, the scheduler 130 is able to route the lost jobs to another machine for processing etc.

For example, referring to FIG. 1, a known grid network 100 is explained in use. The manager component 135 detects which machines are presently operating within the grid network 100 and transmits the information to the scheduler component 130. The manager component 135 may be a separate component to the scheduler 130 or may form part of the scheduler's 130 functionality.

The scheduler 130 periodically receives from the software 4 installed on each of the machines 105, 110, 115, 120 notification of the availability of one or more machines 105, 110, 115, 120 to execute one or more jobs, via the network 125. The scheduler 130, on receipt of a notification, takes a job from its job queue and sends the job to the machine for processing. If more than one machine is available for processing further jobs and the job can be split up into sub jobs that can be processed by the one or more available machine, the scheduler, transmits the sub jobs to the available machines for processing. On completion of the processing of the sub jobs the results are collected by a collector component 140 for transmitting back to the user that requested the job to be processed.

Figure 2:
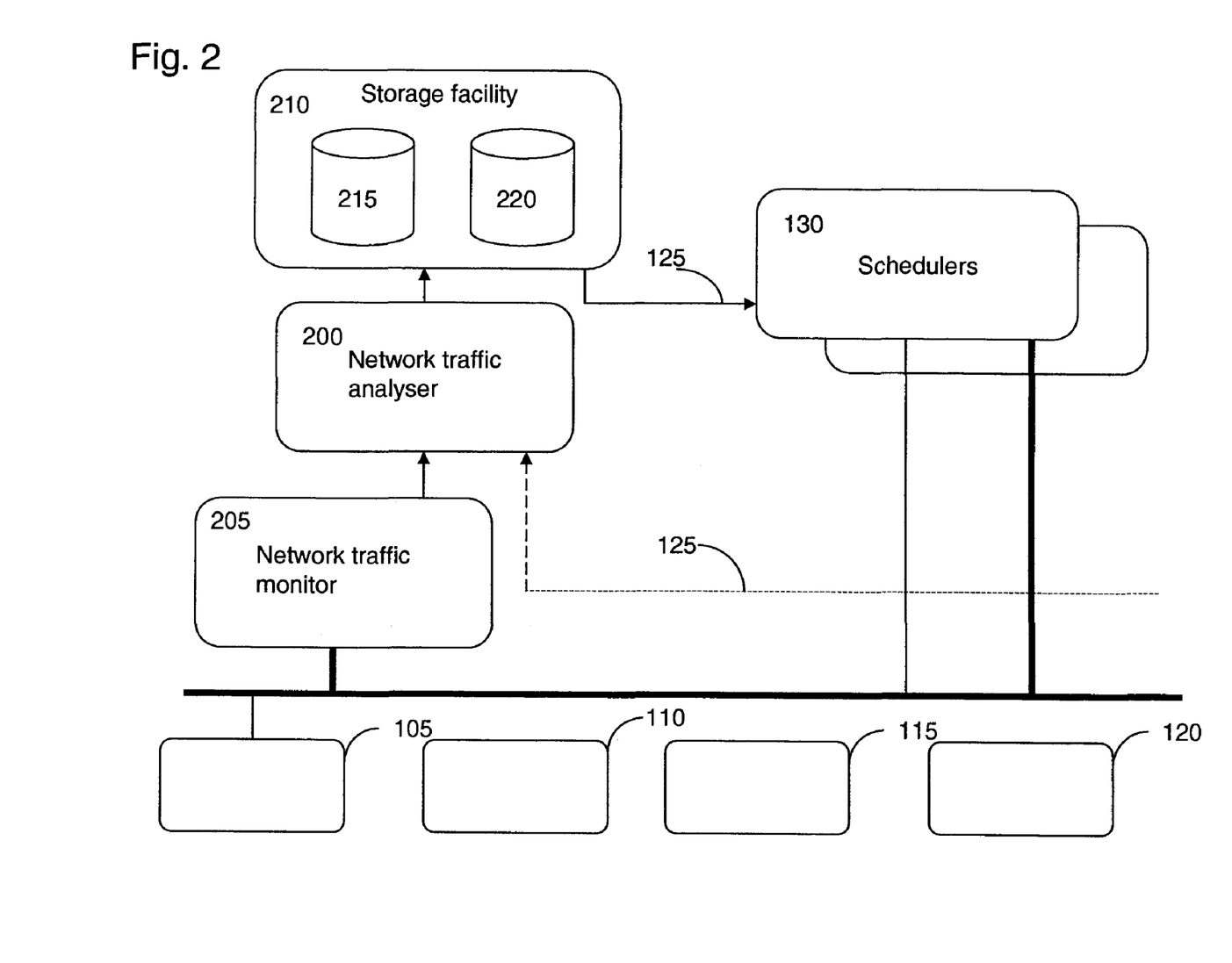
FIG. 2 illustrates the network analyser of a preferred embodiment of the present invention.

The preferred embodiment of the present invention improves on known schedulers 130 by incorporating a network traffic analyser component (NTA) 200 for cooperating with known schedulers into the grid network environment 100.

Referring to FIG. 2 an NTA 200 is provided which cooperates with the scheduler 130 and the management component 135 to analyse network traffic in order to build a profile of history of network activity within the grid network 100. The analysed data is transmitted to the scheduler 130 in order to make informed decisions about which machines to schedule work with.

The NTA 200 may be installed as a stand-alone component providing the appropriate application interfaces in order to cooperate with new and existing scheduler components 130. Alternatively, the NTA 200 may be installed as a plug-in component to existing schedulers 130. The NTA 200 may be physically located on the same machine as the scheduler 130 and the management component 135. Alternatively the NTA 200 may be physically separated from the scheduler 130 but communicating with the NTA 200 over a network 125.

The NTA 200 receives network data packets for analysis from a network monitoring component 205. The network monitoring component 205 monitors the network traffic across the grid network 100 and takes copies of the data packets for transmitting to the NTA 200 for analysis. The network monitor component 205 may comprise any type of network monitoring tool which is capable of taking copies of data packets as they flow across the network. The network monitoring component 205 interfaces with the NTA 200 for transmitting the copies of the data packets to the NTA 200. Although FIG. 2 details one network monitor 205, it should be appreciated by a person skilled in the art that more that one network monitor 205 may be deployed to monitor particular parts of the network 125. For example, a network monitor 205 may monitor a particular network segment in an Ethernet based network.

The network traffic comprises data generated from machines 105, 110, 115, 120 joining and/or leaving the network. The data comprises information about the machine's physical address on the network, the type of request that the machine is making, for example, requesting a resource from another machine on the network, the destination address of the request (the IP address), the network protocol used by the requesting machine (for example, TCP/IP), and the port number of the requesting machine. The network monitor 205 takes a copy of the network traffic in the form of data packets and transmits the data to the NTA 200 for analysis.

Example 1 shows an example of an ARP data packet— which is just one example of a type of data packet. Other type of data packets are UDP, IP, DNS, TCP and ICMP for example.

EXAMPLE 1

| Example of an ARP data packet | |
|---|---|
| Bit number | |
| 11111111122222222223301234567890123456789012345678901 | |
| Hardware Address Type | Protocol Address Type |
| H/W Address Length Prot. Add. Len | Operation |
| Source Hardware Address | |
| Source Hardware Address continued | Source Protocol Address |
| Target Hardware Address (cont) | |
| Target Protocol Address | |

| ARP Parameters (for Ethernet and IPV4) |
|---|
| Hardware Address Type |
| 1. Ethernet |
| 6. IEEE 802 LAN |

| -continued |
|---|
| Example of an ARP data packet |
| Protocol Address Type |
| 2048 IPv4 (oX08000) |
| Hardware Address length |
| 6 for Ethernet/IEEE 802 |
| Protocol Address length |
| 4 for IPV4 |
| Operation |
| 1 Request, 2 Reply |

Optionally, the data packet may comprise vendor extensions for detailing the hardware and the software the machine is running.

Often data packets comprise "payloads" where further data packets are carried. Often the data from one data packet will comprise another data packet. Thus a TCP data packet may contain IP data packets, which themselves may contain other data packets related to specific protocols such as HTTP, NTP, etc. On detecting a data packet, the NTM copies the data packet and any payloads within the data packet and routes the copy to the NTA for analysis.

Figure 3:
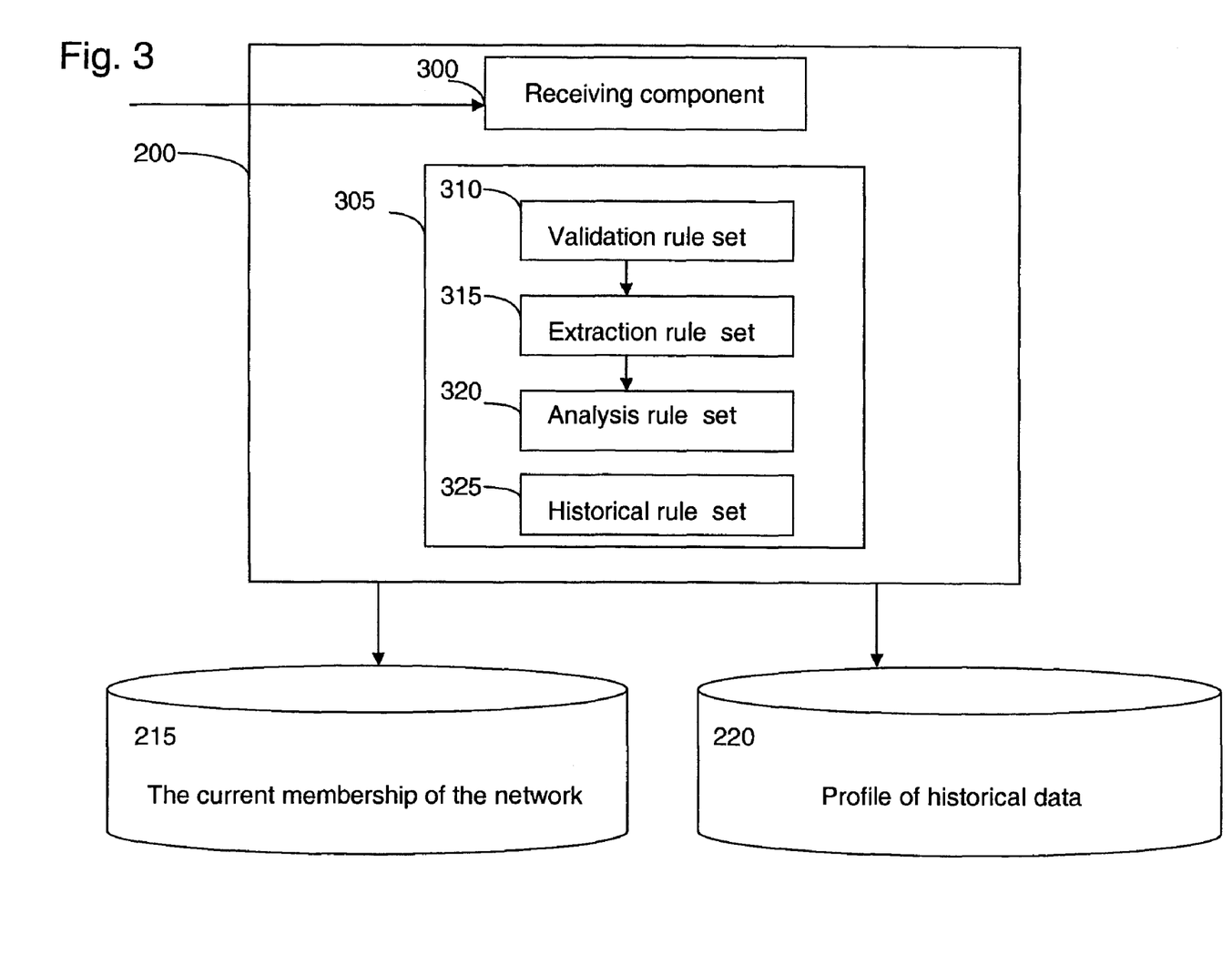
FIG. 3 illustrates the network analyser component comprising its sub components.

As shown in FIG. 3, the NTA 200 comprises a receiving component 300 for receiving copies of the data packets from the NTM 205 and a rules engine 305 for analysing the received data packets. The rules engine 305 interacts with a plurality of rule sets to perform validation, extraction, selection and analysis operations on the copies of the received data packets in order to profile that activity of movement of machines participating on the grid network 100.

The NTA 200 may be developed using any programming language i.e. either a rule based approach using a rules engine and rules sets which can be easily updated by an operator or using a procedural language where the logic of the rules are embedded in the program code.

The NTA 200 cooperates with a storage facility 210. The NTA 200 may reside on the same machine as the storage facility or may be located separately with communication means for performing read and write operations across the grid network 100. The storage facility 210 comprises a number of data stores 215, 220. The data stores 215, 220 are divided into a data store 215 for storing data collected depicting the current membership of the grid network and a data store 220 for storing a profile of historical data for each machine identified as joining or leaving the grid network. The storage facility 210 receives inputs from the NTA 200 and cooperates with the scheduler 130 to transmit the results of the analysed data packets to the scheduler 130 when requested. Thus, the scheduler 130 is able to efficiently determine which machines 105, 110, 115, 120 are able to process requested job and at what time, how long for and how much spare resource is any one particular machine likely to have.

FIG. 3 illustrates the NTA 200 in more detail. As is shown the NTA comprises a receiving component 300 for receiving the copies of the data packets from the network monitoring component 205 and a rules engine 305 comprising a number of rule sets 310, 315, 320 for processing and analysing the information within each data packet.

The receiving component 300 receives the copies of the data packets as they are transmitted from the network monitoring component 205. The receiving component 300 acts as a buffer, holding the received data packets until a rule set is available to process them. On receipt of a data packet the receiving component 300 alerts the rules engine 305 to begin processing the data packet.

The rules engine 305 comprises a plurality of rule sets, namely a validation rule set 310 for validating a received data packet, an extraction rule set 315 for extracting relevant data from the data packet, an analysis rule set 320 for deriving statistical data from the extracted data, and a historical rule set 325 for building a historical profile for each machine 105, 110, 115, 120 identified as participating within the network over a given period of time.

Each of the rule sets will be explained in more detail giving examples.

Validation Rule Set

The validation rule set 310 parses the received data packet and determines what type of data packet it is i.e. TCP, ARP etc. and determines whether the data packet is a data packet that the NTA 200 is interested in. If the data packet is carrying a 'payload' the NTA 200 determines what payload the data packet is carrying and adds this to the header file of the copied data packet for identification. On determination of a data packet of interest, the validation rule set via the rules engine 305 send a trigger message to the extraction rule set 315 to proceed. Alternatively, if the data packet is not a data packet that the NTA 200 is interested in, the validation rule set 305 rejects the data packet.

An example of a validation rule set 305 is illustrated below.

```
# check what type of packet this is
if packet_type = DHCP | ARP | NFS | HTTP | NIS < or whatever list of
protocols whose packets we are interested in>
then
    # this is something we are interested in
    save
else
    # this is NOT something we are interested in
    reject
fi
```

Extraction Rule Set

The extraction rule set 315 parses the data packet and begins to determine the format of the data packet type. For example there are many types of DHCP data packets, i.e. a DCHP discover data packet, a DCHP request data packet and a DCHP ACK data packet. Each type of data packet may comprise a different data format for representing network data. For example, an ACK data packet may comprise fields for information that is not relevant to a DHCP request data type and vice versa. Thus, the extraction rule set 315 parses the data packet to determine what type of data packet it is i.e. DHCP ACK or DHCP response etc.

On determining the data packet type, the extraction rule set 315 determines the specific data format of the data packet type and maps the data to meaningful subject data. For example, if the data packet type is a DHCP ACK data packet then the client network address is found in field two and the client hardware address is found in field three. Therefore the extraction rule set 315 can determine which data is relevant and required for analysis and can proceed to extract and populate the corresponding fields in the current membership data store 215.

An example of an extraction rule set if given below.

```
# DHCP packet handling
if packet_type = DHCP
then
    # check what sort of packet it is
    if field_8 = "ACK"
    then
        # this is an ACK packet
        # The format of an ACK packet is UDP 163.1.15.254:67
(00:D0:BC:00:11:22) > 163.1.15.99:68 (00:00:39:1C:0C:32) DHCP ACK
        # the client network address is in field 2
        client ip address = field_2
        client hw address = field_3
    fi
fi
```

Analysis Rule Set

The analysis rule set 320 parses the current membership data store 215 and begins by analysing the records which have recently been added to the data store 215 or the records which have recently been updated. The analysis rule set 320 begins by identifying what type of machine has recently joined or left the network, what type of request was made, and the time that these activities took place.

For example if the NTA 200 receives a data packet that indicates that a machine has just requested an IP address from a DHCP server. The requesting machine is likely to be a client machine. If the data packet indicates that a machine has just requested to mount a file system from a server, then the requesting machine is likely to be a server.

Another example might be if a data packet indicates that the requesting machine has sent a time_request-response then it is likely that the requesting machine is a server.

Over a period of time activity rule set 320 builds a network activity map of the activities of each of the participating machines including gathering data such as the type of machines that are participating in the network and the times that they arrive and left the network. The activity network map is stored in the current membership data store 215 for further analysis by the historical rule set 220.

The historical rule set 325 builds an historical activity profile for each identified machine participating in the grid network over a given time period. The historical rule set 325 analyses the data stored in the current membership data store to build the activity profile for each identified client or server machine.

For example, a data packet may be received which the analysis rule set identifies as client machine 'x'. The data packet is received at 9:05 am on a Monday morning. The historical rule set performs a lookup in the historical data store to check for the range of times that the client machine usually joins the network. If the current time of the data packet is 9:05 am and the client machine usually joins the network at 9:06 am then the current time is very close to the profiled time and a probability score, associated with this data, in the historical data store is increased.

Conversely if the current time of the data packet was determined as 10:30 am and the profiles activity time is 8:45 am, the historical rule set may consider the current time of 10:30 am to be too large a time gap and hence decrease the probability score for this particular client machine.

An example of the historical rule set is as follows:

```
# A client has just requested an IP address from a DHCP server
if packet_type = DHCP and if client_request = ACK (see above)
then
    # make a note of the current time
    current_time=H;M;S
fi
# check historical database for range of times that this
```

```
client usually joins the network
retrieve time_history <- historic_data
retrieve time_probability <- historic data
if current_time = time_history +/- 1 minute
then
    # this is very close to the original time so increase the probability
    increase time_probability
    save time_probability -> historic data
else if current_time = time_history +/- 20 minutes    < note this would
probably be a tunable parameter based upon expected job runtime>
then
    # this is less close to increase the probability by less than the above
    increase time_probability
    save time_probability -> historic data
else if current_time = time_history +/- 60 minutes
then
    # this is a long way out from the historic data so create a new statistic
    create_new_historic record -> historic data
fi
```

Each of the rule sets interact with the other rule sets to form two sets of analysed data. The first being a data set, which depicts the current membership of the grid network, and is stored in the data store 215 and the second dataset being the historical dataset which is used to predict scheduling targets within the grid network.

An example of the data held in the current membership data store is as follows.

MAC Address
TCP/IP address
Machine name
Length of DHCP lease
Date/Time of joining network
Date/Time of last network activity
Array of: (protocol used, partner address,
protocol used, partner address)
Derived likely machine type (server/client )

Derived Likely Operating System

The second set of data which is derived from the current membership dataset is the historical dataset 220, which provides an historical profile of the activities within the grid network for each machine identified as participating in the network over a give time period.

Example Historical Data Set

The historical data set includes the current membership record for each identified participating machine, augmented with:

The total number of times the system has been seen on the network,
An array containing multiple elements of the form:
    the date/time when the machine has entered the network;
    a ranking, indicating the confidence in this time;
    minimum, maximum, mean and mode for the length of connection; and
    the sample size for this date/time.

Thus, using the historical data, the scheduler is able to make efficient predictions on which machines are likely to be available at a particular time on the network, how long the machines are typically present on the network, and what type of spare resource is likely to be available.

Figure 4:
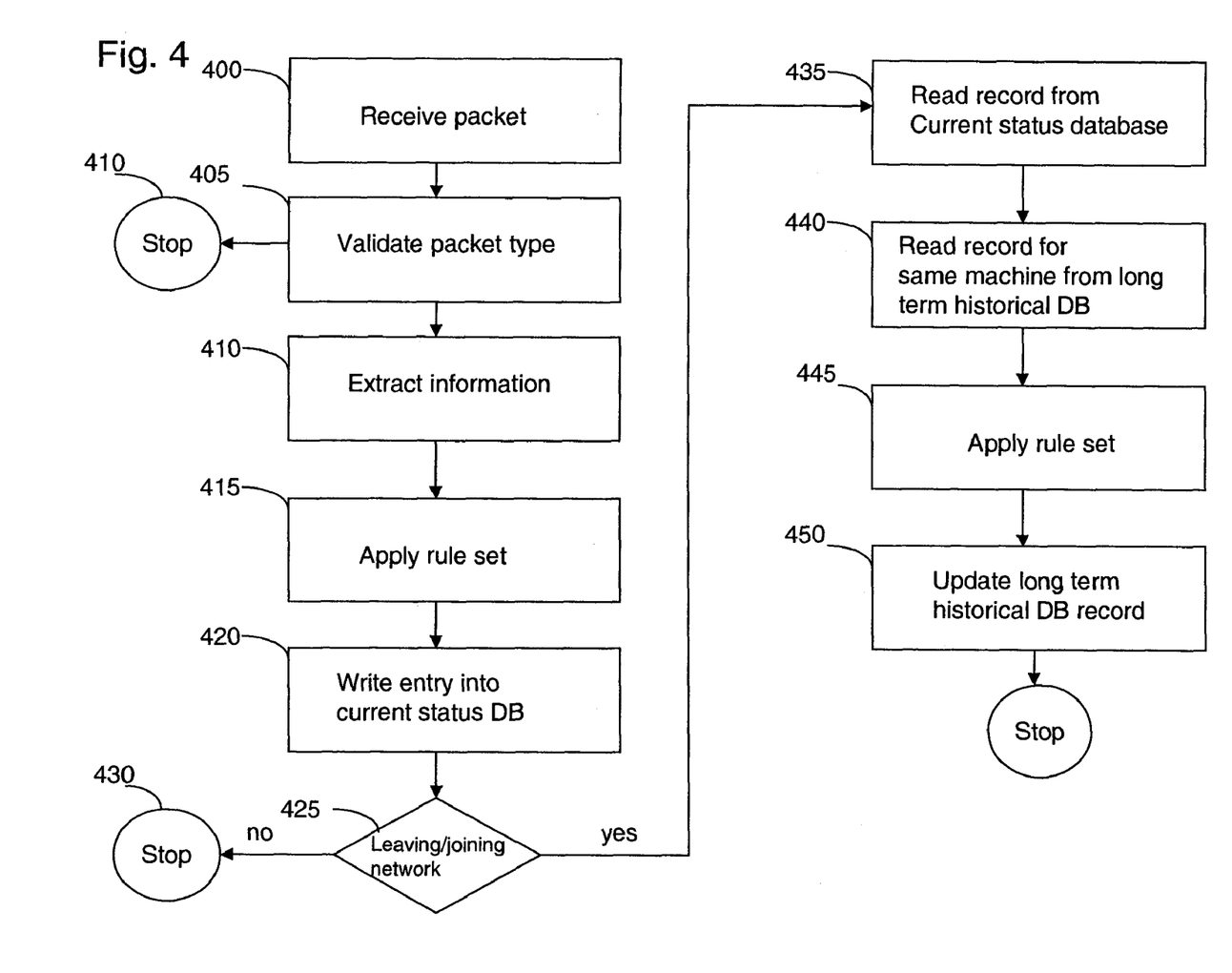
FIG. 4 shows the process steps of the network analyser of a preferred embodiment of the present invention.

FIG. 4 illustrates the process steps of the NTA 200 of the present invention. At step 400, the network monitor 205 monitors the network traffic across the grid network 100. The network monitors takes copies of each of the data packets which pass through the section of the network that it is monitoring. As the data packets are copied, the data packets are transmitted to the NTA 200 for analysis.

At step 405, the rules engine triggers the validation rule set to validate each of the received data packets. The validation rule set validates the data packet to ensure that the data within the data packet is readable and of interest to the NTA 200. If the data packet is not a valid data packet control moves to step 410 and the rules engine disregards the data packet. Moving back to step 405, if the data packet is a valid data packet the validation rule set triggers the extraction rule set to proceed. At step 415 the extraction rule set extracts information from each of the received data packets, such as, the identity of the machine joining the network, the destination source, the protocol being used and the type of request.

At step 420, the rules engine applies the analysis rule set. Which analysis rule set is applied is dependent on the network protocol identified within the data packet. The analysis rule set determines the type of machine, the destination address of the request, the protocol used etc. A decision is made at control 425 to determine whether the current detected network activity is caused by a machine leaving or joining the network. If the decision is positive, i.e. the machine is leaving of joining the network, control moves to step 435 and the record for the identified machine is read from the current membership database. At step 440, the rules engine locates within the historical data store the corresponding historical record for the identified machine. Next at step 445, an historical rule set is applied to determine the probability values representing the activity status for the identified machine and the historical database is updated at step 450.

On receipt of this information the scheduler proceeds to make useful workload scheduling decisions, which previously, had not been possible because of the simplicity of the data sent from the software installed on each of the machines 105, 110, 115, 120 to the scheduler.

Using another worked through example, a data packet 'A' is received by the NTM. The NTM takes a copy of the data packet and transmits the data packet to the NTA for analysis. The validation rule set determines whether the data packet 'A' is a data packet of interest. If the data packet is of interest the extraction rule set proceeds to identify the type of data packet and in response to the identification using another set of rules which inform the extraction rule set the format of type of data packet. For example, a set of rules that state what field a client machines network address in a DCHP ACK data packet. The extraction rule set extracts the appropriate date, for example, time (9:15 am), network address (X) of the requesting machine, the type of request being made (DCHP) and the destination address of the machine serving the request (Y) etc and stores the data in the current membership data store 215.

The analysis rule set monitors the current membership data store and detects that an update has been made for the machine with a network address of 'X'. Because of the type of request that the machine is requesting, the rules state that the machine must be a client machine and this is recorded in the data store 215. Further information maybe stored in the data store such as the type of applications that are stored in the machine and its hardware configuration and any security restriction which may stop the machine from becoming a scheduling target.

Thus the analysis rule set is able to conclude that as machine X has just sent a data packet across the network, that machine X is present on the network and is therefore a possible scheduling target and that the machine is a client machine running a particular operating system with a particular set of applications. The analysis rule set on completion of its analysis sends a trigger to the historical rule set for further processing of the updated data in the current membership data store 215.

The historical rule set proceeds to further analyse the network activity map to determine the probability rating of the data and to build an historical profile of the activity of each machine detected as participating within the network. For example, machine 105 arrived onto the network at 9:15 am. The historical profile of machine 105 states that machine 105 normally arrives on the network at 9:20 am. Thus machine 105 arrived on this occasion five minutes early. Therefore a rule states that if a machine arrives within a boundary of five minutes either side of its profiled time its probability rating should increase. Thus if machine 105 has a profiled probability rating of fifty percent this may rise to fifty five percent. Therefore it is now known that machine 105 is a client machine, running a particular operating system with a particular set of applications and always joins the network at about 9:15 am. The same probability profile is calculated to determine when machine 105 leaves the network. For example, a probability rating of 75% that machine 105 leaves the network at 5:00 pm. Therefore it is known that machine 105 joins the network everyday at about 9:15 am, that machine 105 is a client machine running a particular operating system with a particular set of applications and always leave the network at 5:00 pm. Further by intercepting further network packets and building up a more in depth profile of machine 105 it is also possible to calculate which machine 105 is idle on the network or when it is busy. Each updated profile is transmitted to the scheduler component such that the scheduler component can determine which machines are on the network and which machines will make suitable scheduling targets and at which time period throughout the day.

In another example, a potential scheduling target machine 110 is powered up whilst attached to an IP network. As part of its boot process, the machine 110 requests an IP address from the local DHCP server. Observing the exchange between the target machine 110 and the DHCP server the NTA 200 determines that the scheduling target 110 has joined the network and hence is a possible scheduling target. Optional information flowed in these packets (as vendor extensions etc) may indicate other useful information such as the operating system type, the domain name and the machine name etc.

Subsequent communication between the scheduling target 110 and the other machine results in ARP requests and responses being sent back and forth across the network. Intercepting these data packets allows the NTA 200 to discover a hardware address for the machine and allows the NTA to determine that the machine is still active and present on the network.

At some time later, the scheduling target 110 may be observed sending packets typically associated with NFS file serving onto the network 125. This allows the NTA 200 to identity that the scheduling target 110 is acting in a server role and as such is generally likely to be present on the network 125 for a longer period of time that a client machine. Continued access by the scheduling target 110 to file systems being served by other machines provides further evidence that the system is alive and active. At some point later in time, the scheduling target 110 is shut down. The DHCP address is gracefully released and the data packet exchange between the scheduling target 110 and the DHCP server informs the NTA 200 the scheduling target 110 has left the network and as such is no longer available to accept work.

The foregoing description of the embodiments of this invention has been presented for purposes of illustration and description. It is not intended to be exhaustive or to limit the invention to the precise form disclosed, and many modifications and variations are possible.

What is claimed is:

1. A method for assigning a job request to a device in a grid network, the method comprising the steps of:
   receiving a job request;
   monitoring traffic across the grid network;
   copying data packets sent over the grid network by a requesting device;
   extracting a set of network parameters from the data packets, the set of network parameters comprising a current activity status of the requesting device, an IP address of the requesting device, an IP address of a destination device, and a type of resource the requesting device is requesting from the destination device;
   analyzing the destination IP address and the type of resource to determine a category of device the requesting device falls into, wherein the category of the requesting device is one of a server and a client;
   identifying an activity history for the requesting device;
   deriving a statistical data set by comparing the current activity status with the activity history;
   deriving a time period in which the requesting device is likely to be available for processing job requests by analyzing the statistical data set;
   adjusting the time period based on the determined category of the requesting device, and;
   assigning the job request to the requesting device based on the adjusted time period.

2. A method as claimed in claim 1, wherein the analyzing step further comprises deriving a probability score indicative of a likelihood of a pattern of activity re-occurring.

3. A method as claimed in claim 1, wherein examining a copy of a data packet from a requesting device indicates that the requesting device is active and available on the network.

4. A method as claimed in claim 1, further comprising identifying a type of data packet and performing a lookup, in a data store, to identify a format of the data within the identified data packet type.

5. A method as claimed in claim 4, wherein network parameters are extracted from the data packet and stored in accordance with the format of the data packet type.

6. A method as claimed in claim 5, wherein the extracted network parameters further comprise a vendor extension identifying hardware and software installed on the requesting device.

* * * * *